United States Patent [19]

Diede et al.

[11] Patent Number: 5,466,537
[45] Date of Patent: Nov. 14, 1995

[54] INTERMETALLIC THERMAL SENSOR

[75] Inventors: Amos J. Diede; William H. McCune, both of Ridgecrest, Calif.

[73] Assignee: The United States of America as represented by the Secretary of the Navy, Washington, D.C.

[21] Appl. No.: 45,147

[22] Filed: Apr. 12, 1993

[51] Int. Cl.⁶ ........................................................ B22F 3/02
[52] U.S. Cl. ........................... 428/548; 102/364; 102/377; 102/481; 102/705; 149/108.2
[58] Field of Search ........................ 102/205, 364, 102/377, 375, 481, 705; 337/401; 60/223, 253, 254; 428/546, 548, 554, 557; 149/108.2

[56] References Cited

U.S. PATENT DOCUMENTS

| | | | |
|---|---|---|---|
| 2,813,921 | 11/1957 | Vordahl et al. | 13/18 |
| 3,201,278 | 8/1965 | Kurtzweil et al. | 136/4 |
| 3,378,872 | 6/1973 | Ziemba | 136/90 |
| 3,431,528 | 3/1969 | Richard | 337/414 |
| 3,528,856 | 9/1970 | Ovshinsky | 136/83 |
| 4,331,080 | 5/1982 | West et al. | 102/301 |
| 4,402,776 | 9/1983 | Whipps | 149/108.2 |
| 4,432,818 | 2/1984 | Givens | 149/22 |
| 4,478,151 | 10/1984 | Vetter et al. | 102/481 |
| 4,597,261 | 7/1986 | Dolan | 60/223 |
| 4,843,965 | 7/1989 | Merzals | 102/205 |
| 5,006,429 | 4/1991 | Pracchia et al. | 429/112 |
| 5,129,326 | 7/1992 | Brogan | 102/481 |
| 5,194,219 | 3/1993 | Baldi | 419/37 |
| 5,206,456 | 4/1993 | Pracchia et al. | 102/207 |
| 5,337,672 | 8/1994 | Boissiere et al. | 102/481 |

OTHER PUBLICATIONS

Clark, George L., Editor-in-Chief, *The Encyclopedia of Chemistry*, 1966, pp. 375-376.

*Primary Examiner*—Donald P. Walsh
*Assistant Examiner*—Chrisman D. Carroll
*Attorney, Agent, or Firm*—Stephen J. Church; Melvin J. Sliwka; John L. Forrest, Jr.

[57] ABSTRACT

An intermetallic thermal sensor comprised of a hermetically sealed housing containing alternating layers of electronegative and active metals or their alloys in intimate contact. The layers may be wafer or washer-shaped. If washer-shaped, the holes in the wafers are aligned with each other to create a well within the housing and any extension thereof. A tubular-shaped liner extends into the well and may contain an energetic composition such as $BKNO_3$. In one embodiment a thermite charge in the sensor can be ignited for venting applications. The active metal and electronegative metal and their alloys are selected so that when the melting point of one or both metals, alloys, or metal and alloy pairs has reached its or their melting point in response to external heat within a design range of the sensor, a vigorous exothermic reaction occurs to initiate a gas-producing reaction in the well or to ignite the thermite for operation of a cook-off mitigation system.

26 Claims, 3 Drawing Sheets

INTERMETALLIC THERMAL SENSOR

FIELD OF THE INVENTION

The present invention relates to thermal sensors and more particularly to intermetallic thermal sensors for use in full-spectrum fast, intermediate and slow cook-off hazard mitigation systems.

BACKGROUND OF THE INVENTION

As a result of several well-known tragic accidents and considerable experience with ordnance items exposed to thermal stimulus it has been found necessary to pursue technologies offering more satisfactory solutions to reducing or mitigating reaction response level of munitions subjected to fast cook-off (FCO) and slow cook-off (SCO) threat stimuli. To be in compliance with Insensitive Munitions (IM) requirements, munitions are not permitted to exhibit a reaction response more violent than a burning or deflagration reaction when subjected to a FCO or SCO thermal environment. Likewise, new rocket/missile propulsion systems are required to meet insensitive munitions requirements in prevailing applicable standards. Currently, few propulsion systems available meet the presently applicable FCO requirements and virtually none pass SCO requirements.

The effectiveness of cook-off hazard mitigation systems which cut and/or otherwise vent a rocket motor case prior to ignition of the propellant mass by the endangering thermal stimulus has been demonstrated. In full scale cook-off tests, dramatic reduction in the reaction violence of the motors has been obtained by implementing the active mitigation case venting approach. Nevertheless, cookoff hazard mitigation for rocket motors is a difficult engineering problem, and the technology is still immature, especially in the area of slow cookoff mitigation. No current mitigation systems can effectively and reliably sense and mitigate both fast cookoff and slow cookoff, not to mention intermediate cook-offs. New missile systems currently in the initial stages of design and development are required to meet the insensitive munitions requirements before acceptance for use. Many will not be able to do so without advances in cookoff hazard mitigation technology.

At the present time, the primary problem in the development of a satisfactory case venting cookoff mitigation system is the lack of fully suitable thermal sensor technologies. Mechanical sensors which utilize bimetal, memory metal, and/or wax motor actuators to sense and initiate a mitigation system have been built and tested but are bulky and expensive. Electrically powered thermal sensors, active or passive, generally are not considered capable of meeting design requirements for this application because of one or more of the following reasons: (1) the need for a reliable long-term power source, (2) the need for maintenance, (3) the possibility of system failure or an electrical short resulting in accidental triggering, (4) the difficulty of fool proofing and hardening the system so that it cannot be triggered by aero heating, electromagnetic pulse inputs, or any other stimuli except valid thermal threats, and (5) difficulty assuring electronic component reliability at elevated temperatures in a cookoff environment. For these reasons, all current cookoff hazard mitigation systems are designed around rather primitive thermal sensors which utilize a pyrotechnic charge as the sensing element.

Pyrotechnic thermal sensors can only respond to heating rates at the upper end of the heating rate continuum. Pyrotechnic thermal sensors that are capable of sensing and responding to slow cookoff threats are generally too sensitive to be seriously considered. Thus, current cookoff mitigation systems are unable to sense, respond to, or mitigate hazards presented by intermediate or slow cookoff. As a rule, pyrotechnics also lack precise, reproducible behavior, and their use raises safety issues regarding the mitigation system itself. Some pyrotechnic-based mitigation systems require the implementation of a safe/arming subsystem which adversely impacts complexity, reliability, and cost.

SUMMARY OF THE INVENTION

The present invention is an intermetallic thermal sensor which can be used to sense temperatures which can catastrophically destroy a rocket motor or heat sensitive munitions under slow or fast cookoff conditions. The sensor may suitably comprise, consist of, or consist essentially of a housing containing a stable intermetallic assemblage of electronegative and active metals or their alloys, hereinafter also referred to as reactants, in intimate contact with each other. Such assemblages of reactants may be in alternating layers or wafers of the electronegative metals and active metals or their alloys or in the form of layers of compacted powders of one reactant alternating with wafers of the other reactant. The layered reactants are deposited in one end of the housing. A thermite charge or fuze material may be loaded into the other end of the housing, abutting the last deposited reactant layer. If thermite is used, a thermite trigger pellet is deposited in the interface between the last reactant layer and the thermite to enhance the reaction and thus the thermal output of the reactant layers when they are subjected to enough heat to initiate their reaction. When the entire assembly constituting the sensor is heated to the point where the active metal or alloy melts, a spontaneous and vigorous, but gasless exothermic intermetallic reaction occurs. The thermite trigger pellet then inter-reacts with and enhances the ongoing exothermic reaction which then produces the required amount of heat to reliably trigger the thermite charge into reaction. The resulting thermal output of the sensor can then be used to activate a variety of active mitigation systems in a variety of ways.

Alternative assemblages of the metal and alloy reactants can be produced, including one employing alternating washer-shaped wafers creating an internal thermal well into which a cylindrical metal liner containing a heat releasing or a gas-producing agent may be deployed with appropriate triggering agents as required. The sandwich-like assemblage or stack of the washer-shaped wafers are situated in the housing so that the thermal well liner is aligned with and extends through an opening at one end of the housing. The liner is welded to the sensor housing at the seam constituting its exit point therefrom to hermatically seal the housing. A material capable of producing a useful quantity of gas when subjected to the intermetallic exothermic reaction is deposited in the well liner. When the wafer stack in the sensor housing is subjected to the melting point of one or both of its constituents it produces an intermetallic exothermic reaction which in turn causes the energetic charge in the well to react and produce a reaction such as, but not limited to, gas production. The gas exiting the well liner may be used to drive a moveable piston therein in the direction of the open end of the liner to activate a venting device or it may be used to activate a device which will cut through or rupture the wall of a rocket motor or munitions to prevent its catastrophic failure under adverse thermal environment conditions such as fire.

Unlike pyrotechnic sensors, the intermetallic sensor of the present invention is inherently inactive until a precisely predetermined temperature, for which its assembly is tailored, is exceeded. The invention is free from the possibility of premature triggering. It does not exhibit undesirable hysteresis effects and cannot be triggered by shock, electrostatic effects, friction, or impact. The thermal sensor of the present invention can be triggered in a highly reliable and reproducible manner when heated to the trigger temperature by a thermal stimulus. The trigger temperature is custom tailorable for specific applications by adjusting the composition of the alloys, their fabrication, and assembly within the sensor to obtain the desired melting point. The sensor is highly reliable, non-electrical, non-mechanical, and non-pyrotechnic.

It is thus an object of the present invention to provide a thermal sensor capable of being tailored to trigger over a broad temperature range.

It is yet another object of the present invention to provide a metal/metal, metal/alloy, or alloy/alloy combination of active and electronegative metals and alloys melting at the desired application temperature or temperature range to produce a vigorous but gasless exothermic intermetallic reaction to trigger the desired operative venting function in a cookoff hazard mitigation system.

It is still another object of the present invention to provide a means for coupling with and triggering the operative function of a cookoff hazard mitigation system of which the sensor is an operative element.

It is yet another object of the present invention to provide an intermetallic thermal sensor having an intermetallic internal reactive structure composed of active and electronegative metal and alloy powders pressed into alternating layers or a homogeneous mix in the sensor housing with or without an internal cavity constituting a thermal well.

It is further another object of the present invention to provide a thermal sensor that can be subjected to repeated heating and cooling cycles to within 5° F. of trigger temperature without affecting the trigger temperature and thermal output.

It is still an object of the present invention to provide a thermal sensor that can be repeatedly exposed to a slow cookoff heating environment, close to its trigger temperature without undesirable hysteresis effects, and without the danger of inadvertent triggering by shock, electrostatic effects, friction, or impact.

It is additionally another object of the present invention to provide a thermal sensor that can be used to activate a variety of active mitigation systems in a variety of ways.

It is finally an object of the present invention to provide a thermal sensor that will trigger in a highly reliable and reproducible manner when heated to its trigger temperature by a thermal stimulus.

These and other objects, benefits, and advantages of the present invention will be more clearly revealed and understood upon considering the specification and drawings disclosing this invention.

DETAILED DESCRIPTION

Figure 4:
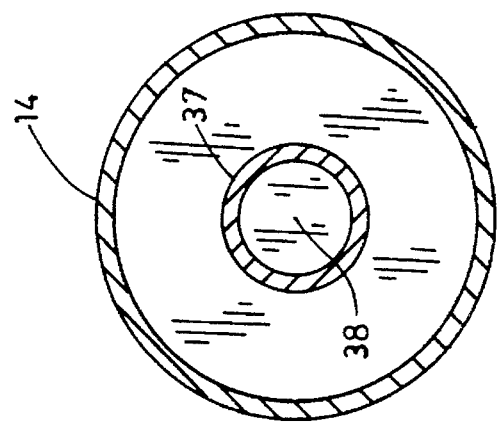
FIG. 4 is a front cross-sectional view of the embodiment of the invention depicted in FIG. 3 taken along line 3—3 in FIG. 3.
Figure 1:
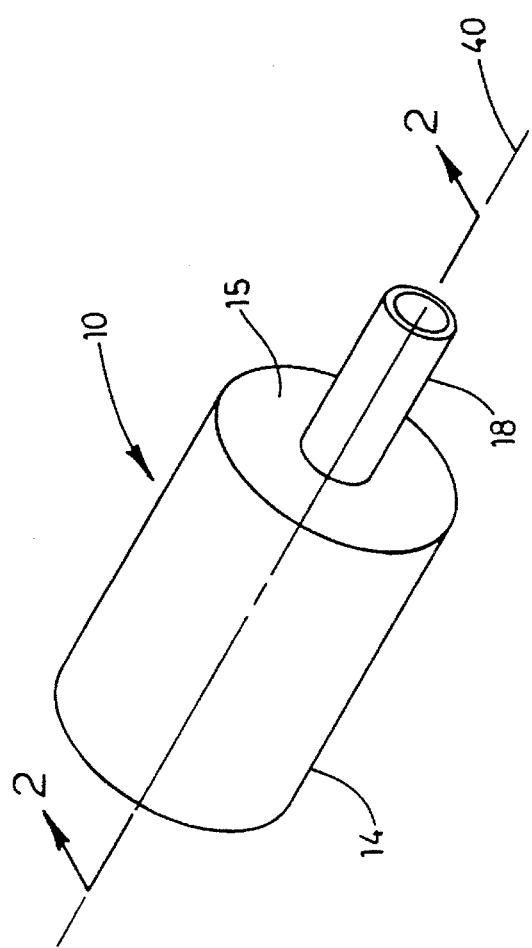
FIG. 1 is a perspective view of the present invention.
Figure 2:
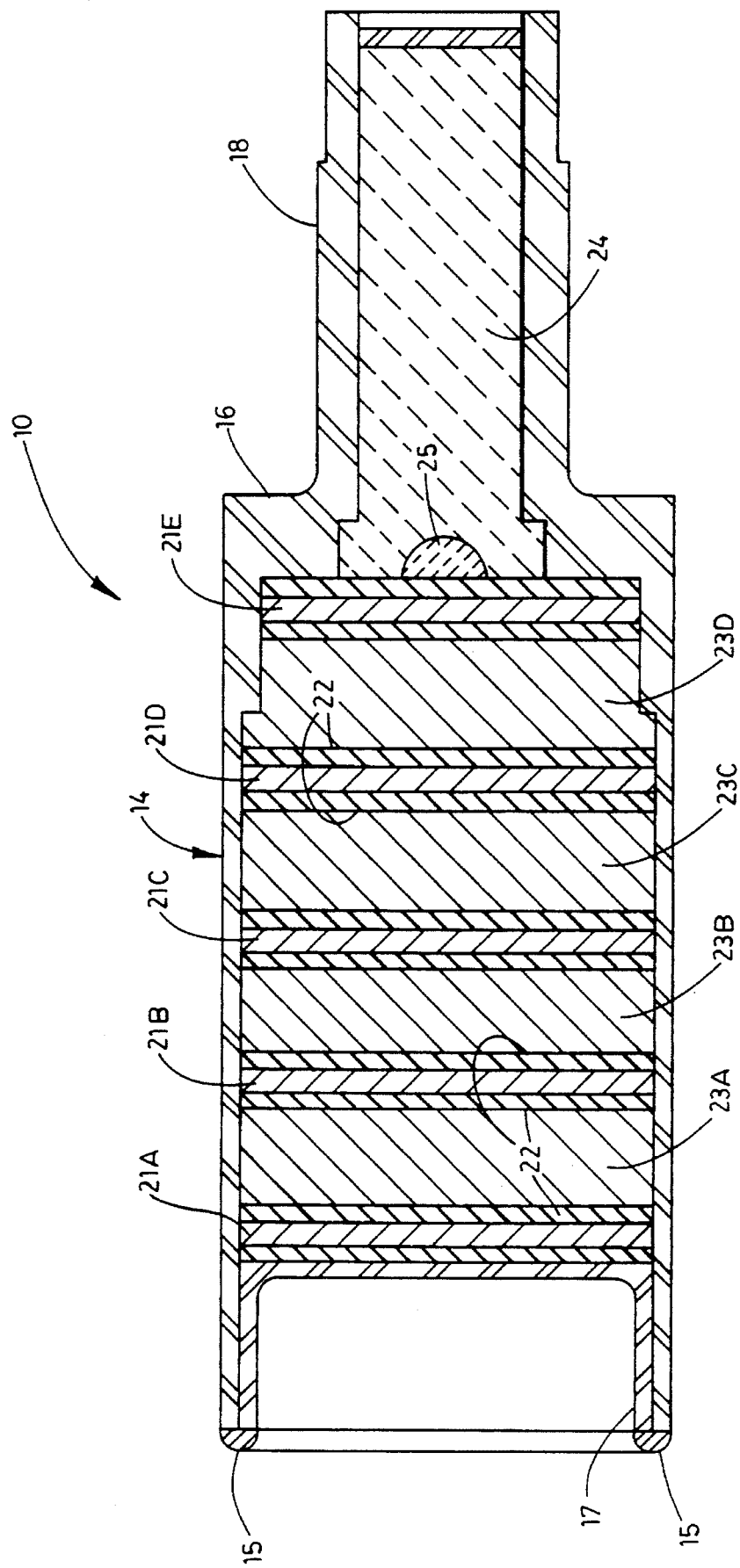
FIG. 2 is a side sectional view of a preferred embodiment of the present invention taken along line 2—2 in FIG. 1.
Figure 3:
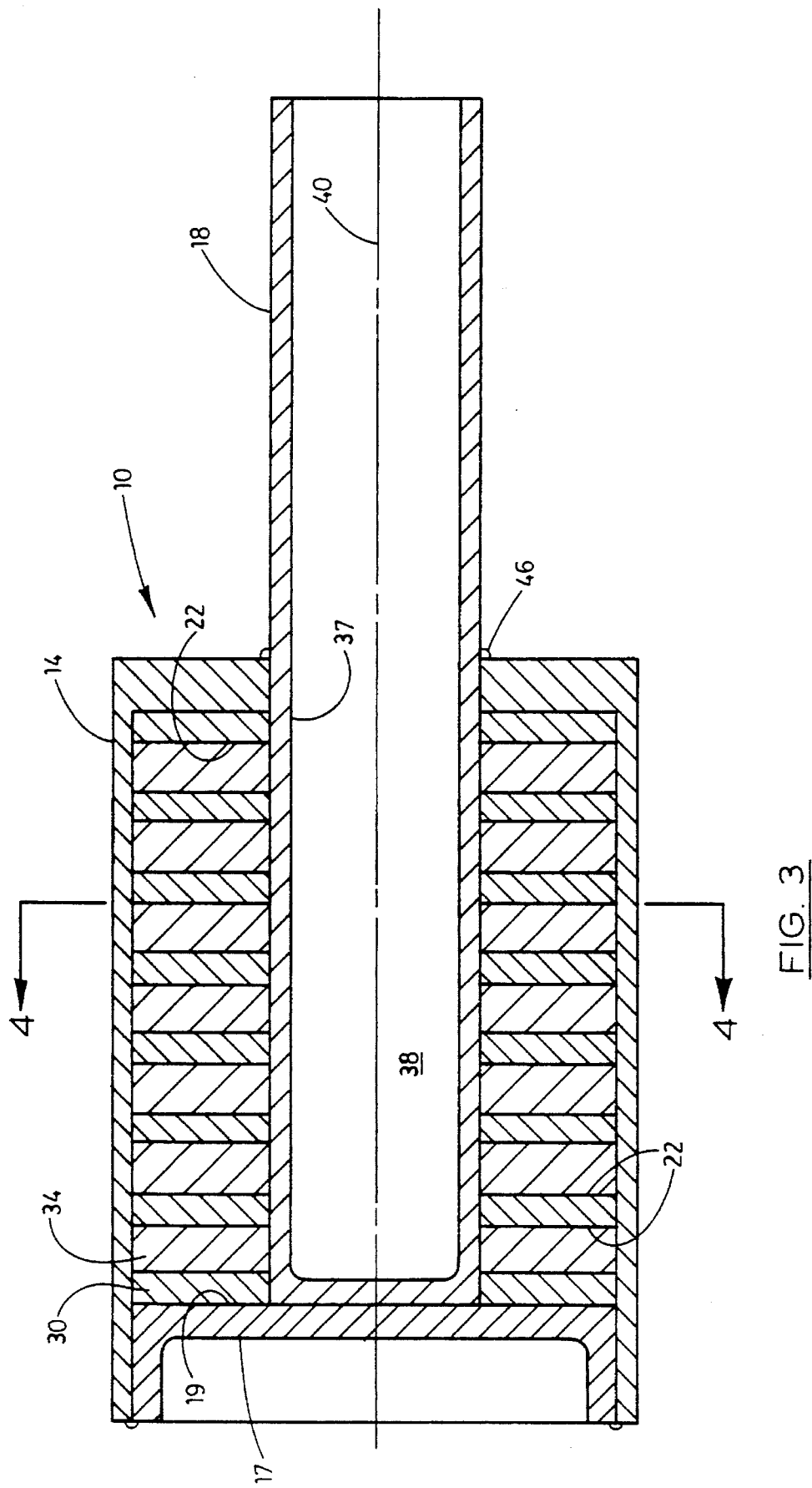
FIG. 3 is a side sectional view of another embodiment of the present invention taken along line 2—2 in FIG. 1.

Referring to FIGS. 1 to 4 the thermal sensor of the present invention is depicted in a preferred embodiment (FIG. 2) and an alternative embodiment (FIGS. 3 and 4).

In FIG. 1 the intermetallic thermal sensor 10 is shown comprising the housing 14 having an integral closed end and an opposite end having an extension 18 extending either from a continuous neck 16 of the housing 14 as depicted in FIG. 2 or from the end wall 15 depicted in FIG. 1. In FIG. 3 the liner 37 in the thermal well 38 has a portion external to the housing 14 which constitutes the housing extension 18.

The embodiment of the present invention shown in FIG. 2 shows the housing 14 with its continuous neck 16 and integral extension 18. A lid 17 is press-fit into the end of the housing 14 opposite the extension 18. Excess material is trimmed so that the lid surfaces are flush. The housing is then fixtured in an aluminum block which serves as a heat sink while the seam 15 is electron-beam welded. The housing 14 and lid 17 are fabricated from alloy 17-4PH, H900/950 condition. Other suitable steels can also be used. Within the housing 14 and abutting the surface of the lid 17 therein is the first wafer 21A of electronegative metal or alloy. Progressing toward the housing extension 18, the next layer is one of active metal or alloy pellets or wafers 23A. Next another wafer 21B of electronegative metal followed by another layer of active metal 23B, and so on through alternating wafers 21C, and 21D of electronegative metal separated by layers 23C, and 23D of active metal until within the portion of the housing 14 in the neck 16 the stacking or sandwiching of the alternating wafers 21 and layers 23 is concluded with the final wafer 21E.

The wafers or layers of pellets or powders of active metal such as lithium alloy sandwiched in intimate contact with wafers of an electronegative metal or alloy form a stable system until the melting point of one or both metals (or alloys) is reached. In almost all cases the system is stable (unreactive) until the lithium or lithium alloy begins to melt. The electronegative metal or alloy is chosen so that it is still solid when the active metal melts. If the electronegative metal melts before the active metal, a runaway intermetallic reaction will not occur until the active metal also begins to melt, but the system is inherently unstable, an undesirable situation. When the melting point of the lithium metal or alloy has been reached, a spontaneous and vigorous, but gasless exothermic intermetallic reaction occurs which provides the energy to initiate the action of the mitigation system. For example, $7Li+2Sn \rightarrow Li_7Sn_2$ liberates 300 cal/g and $7Li+2Pb \rightarrow Li_7Pb_2$ liberates 165 cal/g. The resultant adiabatic reaction temperatures for these two reactions are 1900° F. and 1600° F. respectively. The reaction $2Li+Se \rightarrow Li_2Se$ liberates 910 cal/g and is very energetic.

It is the melting temperature of the active metal that initiates the intermetallic reaction and triggers the sensor, therefore, the desired trigger temperature of the sensor is obtained by selecting an active metal or alloy with the desired melting temperature. For example, in one application to mitigate the slow cookoff reaction of a particular rocket motor a trigger temperature of approximately 330° F. is required. In another similar application a trigger temperature of 292° F. is required. Referring to FIG. 2, the composition of the active layers of metal pellets 23 which are of lithium metal determines the trigger temperature of the sensor.

The table below gives several compositions and the resultant trigger temperatures of the sensor.

| Li Alloy | Melting Temp. °F. | Trigger Temp. of Sensor °F. |
| --- | --- | --- |
| Pure Lithium | 354–358 | 354 ± 2 degrees |
| 70.0% Lithium 30.0% Zinc Eutectic | 328–330 | 331 + 1 degrees − 2 |
| 67.0% Lithium 33.0% Calcium Eutectic | 290–292 | 292 + 1 degree − 2 |

Binary and tertiary alloys of lithium and the following metals enable the formulation of a wide variety of eutectic and single phase alloys with very precise melting temperatures. The possible alloying constituents are: calcium, strontium, barium, zinc, aluminum, gallium, silver, platinum, palladium, gold, carbon, bismuth, lead, and thallium. Pure lithium, or lithium Alloys used in a sensor in the manner shown in FIG. 2, provide a wide variety of specific predetermined sensor trigger temperatures within the range of 270° F.–360° F. Li/Zn/Ag and Li/Zn/Ga/Ag alloys used as the active metal layers can be formulated to obtain trigger temperatures of 302° F., 310° F., 315° F., and 320° F.

The electronegative alloy chosen for the sensor shown in FIG. 2 is a eutectic alloy of 63.0% tin and 37.0% lead which melts at 361° F. This alloy was chosen because it provides a sharper trigger response than pure tin or virtually any other electronegative metal or alloy tested. The tin/lead alloy also yielded one of the highest reaction temperatures. The tin/lead alloy worked equally well with pure lithium as well as the lithium/zinc and lithium/calcium alloys. The reactions of the following electronegative metals with lithium and lithium alloys were evaluated. Many binary and tertiary electronegative alloys (most were tin based) were also tested and evaluated. The metals considered were: tin, lead, bismuth, indium, cadmium, antimony, thallium, zinc, and the semi-metals selenium and tellurium. The conclusion was that selenium (which does not form usable alloys) yielded the most impressive heat release but did not trigger in a reproducible manner when pressed in direct contact with the lithium alloy. Furthermore, selenium when used by itself liberates small but significant and undesirable amounts of vapor during the reaction, and selenium is brittle and cannot be fabricated into wafers. The electronegative alloy which yielded the best overall performance in the packaging arrangement shown in FIG. 2 was the eutectic tin/lead alloy.

The number and thickness of the individual wafers was empirically determined by measuring the peak temperature of a matrix of sensors which were identical, except for the number and thickness of the wafers within the sensor. If many thin wafers are used, mixing and reaction rates are higher, but there is more surface area for diffusion and fabrication/assembly costs are higher. Increasing the thickness of the wafers and correspondingly reducing the number did not affect sensor performance significantly until a critical value was reached. The wafers used in the design shown in FIG. 2 and FIG. 3 were made as thick as possible without exceeding the critical value at which a significant break in performance was observed to occur. In the embodiment in FIG. 2 the wafers or layers of lithium metal/alloy were 0.358 inch in diameter, approximately 0.10 inch thick and weight, depending on the density and type of alloy used of about 120 mg each. The tin alloy wafers were also 0.358 in diameter but one was 0.010 inch thick weighing 120 mg, one other was 0.018 inch thick weighing 249 mg, and 2 others were 0.035 inch thick weighing 497 mg.

The tin alloy wafer 21E in contact with the a metallic selenium pellet 25 is made thinner than the others so that unreacted lithium would be available near the selenium pellet. The idea is that the intermetallic reaction will heat the mass of the sensor and deliver hot unreacted lithium to the selenium pellet at the right time to ensure rapid and full energy release between the lithium and selenium. The lithium/selenium reaction was chosen because it is one of the few candidate intermetallic reactions capable of reliably igniting a thermite charge 24.

Finally, in the embodiment depicted in FIG. 2 the deposit of thermite 24 is located within the extension 18 abutting the surface of wafer 21E facing the extension 18.

The thermite charge 24 is pressed into the extension 18 of the sensor 10. Thermite is a stoichiometric ratio of red iron oxide ($Fe_2O_3$) and aluminum powder. In the embodiment of FIG. 2 the thermite composition is 67.15% $Fe_2O_3$, 23.87% H-15 aluminum powder, 6.00% $V_2O_5$ ultra fine powder, and 2.98% H-3 aluminum powder. The thermite is thoroughly mixed and screened through a screen with a 425 micron hole size. A charge of 0.425 g of the thermite was pressed into the sensor with a pressure of 4000 psi. Thermite is extremely difficult to "ignite" requiring a temperature of >2000° F. to ignite. Once ignited, the reaction $Fe_2O_3+2Al \rightarrow 2Fe+Al_2O_3$ yields molten iron and aluminum oxide at 5200° F. The reaction is unique in that although it is very energetic, it is difficult to initiate, and the reaction does not yield any gases. The thermite increases the energy density and peak temperature at the tip of sensor 10 when the sensor triggers. The peak temperature reached by the intermetallic reaction products is not high enough to reliably ignite the thermite charge. The metallic selenium trigger pellet 25 is incorporated into the sensor because it will react vigorously enough with the intermetallic reaction products to reliably ignite the thermite charge 24. The selenium trigger pellet 25 of mass equal to 45–50 mg is placed between the thermite 24 and the tin/lead wafer 21E because it is incompatible with lithium but is perfectly compatible with both thermite and the tin/lead alloy. It is embedded in the thermite charge and flush with the surface of the thermite. The selenium used must be the grey or metallic allotrope which melts at 217° C.

In the preferred embodiment depicted in FIG. 2 the sensor 10 is 1.2 inch long and 0.375 maximum diameter. It should be further observed that copper plating 22 is electroplated to each side of wafers 21A,B,C,D, and E, in a copper cyanide/ sodium cyanide/sodium carbonate/Rochelle salt bath at 130° F. to deposit 3–4 mg of copper per wafer to a nominal thickness of 0.0001 inch.

In a 6° F./hr slow cookoff environment, the sensor spends many hours at elevated temperatures near the intended trigger temperature before the lithium alloy actually melts. Due to the fact that lithium is an extremely light atom (only hydrogen and helium have lighter atoms), lithium diffuses an appreciable depth into the tin alloy wafers at elevated temperatures and forms a layer (crust) of intermetallic reaction products before the lithium alloy actually melts. This process does not necessarily dud the sensor but slows the triggering speed and reduces the peak temperature. It was found that electroplating the tin/lead wafers with 0.0001 inch of copper significantly reduced the diffusion and inhibited interaction between the lithium and electronegative alloys. When the lithium melts, the copper is dissolved by the molten lithium and the intended intermetallic reaction is free to occur.

In the embodiment in FIG. 3 the housing 14 is structurally similar to the embodiment in FIG. 2. A first washer-shaped wafer of electronegative material 30 abuts the closed end wall 19 inside the housing 14 created by the lid 17. As shown in FIG. 3 the next abutting wafer is the washer-shaped active material 34. This is followed by the washer-shaped wafer of electronegative material. The assembly of alternating washer-shaped wafers of electronegative metal 30 and active metal 34 continues until a sensor 10 of the appropriate size for the particular application is produced. Active metals for use in the sensor 10 are as described above. The couples or pairs of metals selected for use in a particular sensor may be fabricated as wafers which are assembled in intimate contact with each other or the reactive assemblage may be fabricated by compressing a mixture of the metals in powdered form. The washer-shaped wafers 30 and 34 when stacked or assembled as described result in there being created a thermal well 38 centrally and symmetrically extending along the longitudinal axis 40 of the sensor. A liner 37 which is fabricated from steel in the preferred embodiment is inserted in the well thus created and welded to the housing 14 at the seam weld 46. A compound or material containing an energetic charge and capable of producing gas or heat or other similar effects in response to the highly exothermic reaction of the electronegative and active metal wafers of the sensor 10 and that can trigger or produce cutting action initiating the rupture of a rocket motor or weapon casing to which the sensor 10 is affixed is deposited or otherwise located in the liner 37 of the well 38. Thermite, BKNO₃ and fuze materials are examples of charges that can be deposited in the well 38.

OPERATION

The intermetallic cookoff hazard sensor 10 employs the intermetallic alloying reactions which occur between the active metals and the electronegative metals or their respective alloys fabricated in intimate contact with each other inside the sensor housing. The necessary intimate contact is achieved by fabricating the metal reactants as wafers 21A–21E of electronegative metal or alloy wafers alternating with layers of active metal or alloy pellets 23A–23D in FIG. 2 depicting one preferred embodiment or as alternating washer-shaped wafers 34 and 30 of active metal or alloy and electronegative metal or alloy, respectively, in FIG. 3 depicting another preferred embodiment.

In FIG. 2 when the temperature to which the sensor 10 is subjected reaches the melting point of the active metal or alloy pellets 23, a spontaneous and vigorous, but gasless exothermic intermetallic reaction occurs. This reaction is inhibited until the active metal, lithium in the preferred embodiment discussed above, begins to melt or has completely melted. The electronegative metal is electroplated with a 0.0001 inch layer 22 of copper or separated from the active metal by a 0.0001 inch foil of copper to reduce the diffusion of the lithium into the tin alloy wafers, in the case described. Such diffusion would adversely affect sensor 10 performance by reducing triggering speed and peak temperature in an unpredictable manner. Once the copper coating is compromised the reaction occurs, and the exothermic output reliably ignites the selenium trigger pellet 25. The pellet 25 reacts vigorously with and enhances the reaction of the active and electronegative metal or alloy reactants to produce the heat required to reliably ignite the thermite 24 in the housing extension 18. The resulting thermal output of the sensor can then be used in a variety of fast and slow cookoff mitigation systems or other similar applications.

In the second embodiment described above in FIG. 3 washer-shaped wafers or layers of active metal or alloy and electronegative metal or alloy such as 34 and 30, respectively, are introduced in alternating layers into the sensor housing 14. Other arrangements are also possible. Thus, when washer-shaped layers or wafers, for example, of an active metal or active metal alloy are sandwiched in intimate contact with washer-shaped layers or wafers of an electronegative metal or alloy, a stable intermetallic system having an integral thermal well 38 is formed until the melting point of one or both of the metals or alloys is reached. Here again an electroplated layer of copper on the electronegative metal or a copper fail separator between the layers is used as an inhibition to manage diffusion of one reactant into the other to the detriment of sensor 10 performance, as discussed above. When this melting point is reached, a vigorous, but gasless, exothermic intermetallic reaction occurs which can then be used to initiate the action of an energetic compound or material deposited in the thermal well 38 and thus trigger the mitigation system to which the sensor 10 is coupled. Examples of particular compounds or materials which can be deposited in well 38 and their applications are BKNO₃ to produce gas, fuze wire, and pyrotechnics. The gas or pyrotechnics can be used in conjunction with a piston placed in the liner 37 to move the piston and actuate a detonator.

The sensor 10 of the present invention is inherently inactive until subjected to an external thermal stimulus at a temperature in excess of the precisely predetermined trigger temperature. The sensor is free from premature triggering, does not exhibit undesirable hysteresis effects, and cannot be triggered by shock, electrostatic effects, friction, or impact. By adjusting the composition and thus the melting point of the metal/alloy reactants in the sensor and the amount and type of external insulation, if any, used to wrap the sensor 10, the trigger temperature of the sensor can be custom tailored for each specific application.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the forms hereinbefore described being merely exemplary embodiments thereof.

What we now claim as our invention is:

1. A fast, intermediate, and slow cookoff thermal sensor, comprising:

a hermetically sealed housing;

a layer of electronegative metal disposed in said housing; and a layer of an active metal disposed in said housing, said layer disposed in abutting interface with said layer of electronegative metal, so that, when the sensor is heated to a predetermined temperature at which said active metal melts, an exothermic intermetallic reaction occurs between said electronegative metal and said active metal.

2. The sensor of claim 1 further comprising a means for inhibiting the diffusion of the metal of one layer into the other, said means disposed in the abutting interface between the two layers.

3. The sensor of claim 2 wherein said inhibiting means is disposed upon a surface of one of said layers in abutting contact with a surface of the other said layer.

4. The sensor of claim 3 wherein said means is an electroplated metal layer that is dissolved by the first to melt of the active metal layer or the electronegative metal layer.

5. The sensor of claim 4 wherein said electroplated layer is of copper.

6. The sensor of claim 5 wherein said copper layer has a thickness in a range of about 0.0001 to about 0.0002 inch.

7. The sensor of claim 1 wherein said layer of electronegative metal is comprised of a metal selected from the group consisting of Sn, Bi, Pb, Sb, and In.

8. The sensor of claim 7 wherein said layer of electronegative metal includes an alloy of said metal.

9. The sensor of claim 8 wherein said layer of electronegative metal is comprised of a eutectic alloy of 63.0% tin and 37.0% lead.

10. The sensor of claim 1 wherein said layer of active metal is comprised of lithium.

11. The sensor of claim 10 wherein said layer of active metal includes an alloy of lithium and one or more metals selected from the group consisting of Ca, Ba, Ga, Zn, Sr, and Ag.

12. The sensor of claim 1 wherein said layer of active metal is wafer-shaped and said layer of electronegative metal is wafer-shaped.

13. The sensor of claim 1 wherein said layer of active metal is comprised of pellets and said layer of electronegative metal is wafer shaped.

14. The sensor of claim 1 wherein said layer of active metal is washer-shaped and said layer of electronegative metal is washer-shaped.

15. The sensor of claim 1 wherein said layer of electronegative metal is comprised of a compressed powder of said metal.

16. The sensor of claim 1 wherein said layer of electronegative metal is comprised of compressed powder of an alloy of said metal.

17. The sensor of claim 1 wherein said layer of active metal is comprised of a compressed powder of said metal.

18. The sensor of claim 1 wherein said layer of active metal is comprised of compressed powder of an alloy of said metal.

19. The sensor of claim 1 wherein said housing has a centrally disposed tubular-shaped extension from one end of said housing and a continuous neck transitioning said housing into said extension.

20. The sensor of claim 19 further comprising a deposit of thermite within said housing extension and in abutment with the last of said layers disposed in the end of said housing adjoining said extension.

21. The sensor of claim 20 further comprising a thermite trigger pellet disposed between said thermite and the abutting surface of said last layer disposed therein.

22. The sensor of claim 21 wherein said pellet is composed of metallic selenium.

23. The sensor of claim 14 wherein stacking of said washer-shaped layers in said housing defines a well and wherein the sensor further comprises an elongated tubular-shaped liner having one closed end and an opposite end, the closed end of said liner immovably disposed in said well, such that the closed end of said liner abuts one end of the inside of said housing and the open end of said liner extends sealably through the opposite end of said housing.

24. The sensor of claim 1 wherein said layer of active metal includes lithium and wherein the sensor further comprises a layer of metal disposed in the abutting interface between the layer of active metal and the layer of electronegative metal for inhibiting diffusion of said lithium into said layer of electronegative metal before the sensor is heated to said predetermined temperature at which said active metal melts.

25. The sensor of claim 24 wherein said layer of metal disposed in the abutting interface for inhibiting diffusion of said lithium is a metal that dissolves in said active metal when said active metal melts so that said intermetallic reaction is free to occur.

26. The sensor of claim 24 wherein said layer of metal disposed in the abutting interface for inhibiting diffusion of said lithium consists essentially of copper.

* * * * *